United States Patent
Meux

[15] 3,670,266

[45] June 13, 1972

[54] PHASE-COHERENT FREQUENCY-SHIFT MODULATION SYSTEM FOR OSCILLATION MULTIVIBRATOR

[72] Inventor: Patrick de Laage de Meux, Saint-Germain-en-Laye, France

[73] Assignee: Ligne Telegraphiques et Telephoniques, Paris, France

[22] Filed: Dec. 15, 1970

[21] Appl. No.: 98,383

[30] Foreign Application Priority Data

Jan. 14, 1970 France ....................7001141

[52] U.S. Cl. ....................332/14, 331/111, 331/179, 332/9 T

[51] Int. Cl. ....................H04l 27/12

[58] Field of Search ....................332/9, 9 T, 14; 331/111, 179; 325/163

[56] References Cited

UNITED STATES PATENTS

| | | | |
|---|---|---|---|
| 3,064,208 | 11/1962 | Bullock et al. | 332/9 R |
| 3,334,309 | 8/1967 | Murphy et al. | 331/111 X |
| 3,390,354 | 6/1968 | Munch | 332/9 T |
| 3,417,332 | 12/1968 | Webb | 325/163 |
| 3,486,133 | 12/1969 | James | 331/111 |
| 3,497,830 | 2/1970 | Colton et al. | 332/9 R |

*Primary Examiner*—Alfred L. Brody
*Attorney*—Abraham A. Saffitz

[57] ABSTRACT

A modulation system for a free-oscillating multivibrator consisting of an operational amplifier having a first non-phase inverting input, a second phase-inverting input and an output, combined with two feedback circuits respectively coupling said output to said first and second inputs. One of said circuits consists of a voltage divider, while the second includes a capacitor in series with a resistor. Frequency modulation is obtained by variation of the latter resistor. Preferably, the latter circuit also includes a transistor in emitter-follower connection and having its base electrode fed from the output of the multivibrator through other voltage divider means.

3 Claims, 4 Drawing Figures

Figure 1:
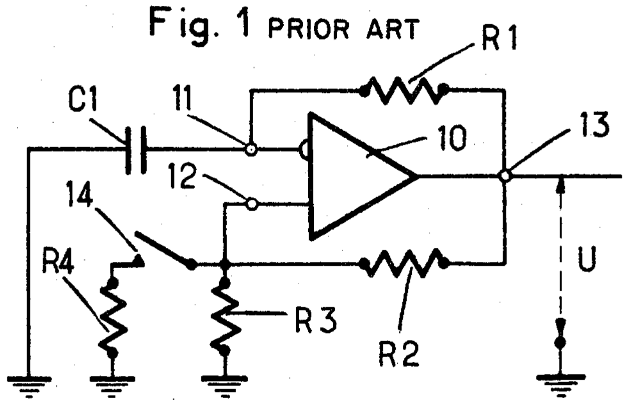
Fig. 1 PRIOR ART

INVENTOR:

Patrick de LAAGE de MEUX

By Abraham A. Saffitz

ATTORNEY

INVENTOR:
Patrick de LAAGE de MEUX
By Abraham A. Saffitz
ATTORNEY

PHASE-COHERENT FREQUENCY-SHIFT MODULATION SYSTEM FOR OSCILLATION MULTIVIBRATOR

This invention relates to a free-running multivibrator capable of delivering an oscillatory electric signal whose frequency may take up various discrete values seriatim without any break in the phase of the wave forming the signal at transition instants between frequencies.

Circuits of this kind are widely used in frequency modulation transmission systems, more particularly, for instance, in voice-frequency telegraphy and in data transmission systems using frequency shift modulated signals.

In the prior art versions of such transmission systems, the signal generator is often a multivibrator whose oscillation frequency takes up one particular of a number of different discrete values, for instance, two different discrete values in the case of binary code data transmission. Frequency shifting is produced by varying the value of multivibrator circuit elements which govern the oscillation frequency; for instance, the resistance which determines the time constant of a resistance-capacitance (RC) circuit can be varied for this purpose. In practical embodiments of multivibrators of this kind, difficulties are caused by phase breaks which may occur in the signal wave at a changeover from one frequency to another. These breaks must be obviated or at least have their effects reduced, since they are responsible for telegraphic distortion. Conversely distortion is minimal in the absence of phase break during transitions.

There are some known systems which meet this condition, such as the "Astable multivibrator" disclosed by Western Electric Company's French Pat. No. 1,388,151 of Jan. 20, 1964; the circuit comprises means for connecting additional resistors into the load paths of the crossover coupling capacitors of a symmetrical two-transistor circuit arrangement, changeovers from one resistance value to another being controlled by a binary signal via a circuit comprising diodes and being so designed that upon the cessation of charging of the capacitor, the ratio of the voltage applied to the RC circuit to the voltage across the capacitor does not alter.

Other systems are known for producing frequency shift signals without phase break; one such example is disclosed in the U.S. Pat. No. 3,417,332 for "Frequency shift keying apparatus" in the name of National Space and Aeronautics Administration, wherein two different frequencies which are both integral multiples of the frequency of the data modulating signals are produced and logic means ensure that the shift from a signal at a first frequency to another signal at the other frequency occurs at the end of a complete cycle of the first signal and at the start of a complete cycle of the second signal.

This invention relates to a device producing frequency shift modulated signals and comprising a multivibrator having an RC circuit whose time constant can be modified to obviate phase breaks, thanks to a modulating circuit embodied differently from those used in the prior art systems.

According to the invention, there is provided an oscillating multivibrator capable of being phase-coherent frequency-shift modulated by modulation signals, comprising, in combination, an operational amplifier having a non-phase inverting first input, a phase-inverting second input and an output, a first voltage divider consisting of two series-connected resistors connected between said amplifier output and a reference potential point, the common point to said two resistors forming the output point of said multivibrator, a second voltage divider consisting of two further series-connected resistors and connected between said output point and said reference potential point, with the common point to said two further resistors connected to said second amplifier input, said oscillating multivibrator also comprising a coupling circuit connecting said output point to said first amplifier input, and a variable resistor having its resistance value controlled by modulating signals and connected by one of its terminals to said reference potential point and by the other of its terminals to said first amplifier input, said coupling circuit comprising a capacitor having one of its terminals connected to said first amplifier input and its other terminal connected to a coupling point in said coupling circuit, said coupling circuit presenting a high impedance path between said coupling point and said reference potential point and a low impedance path between said reference potential point and said output point.

Figure 2:
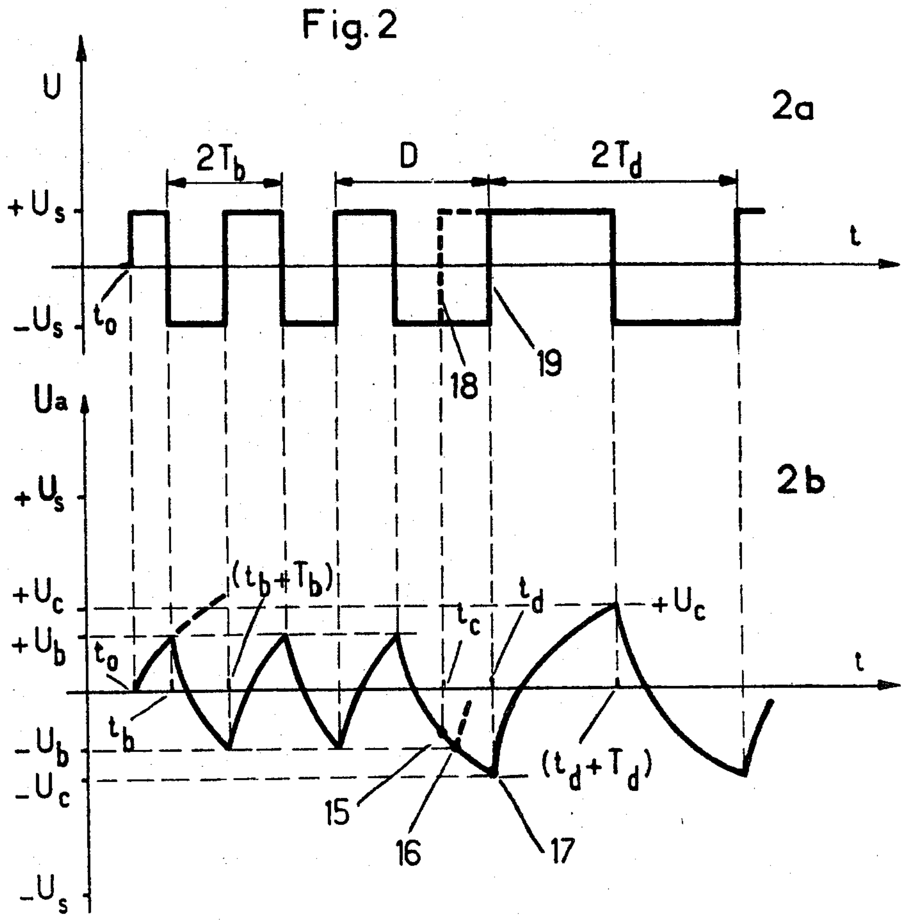
Figure 3:
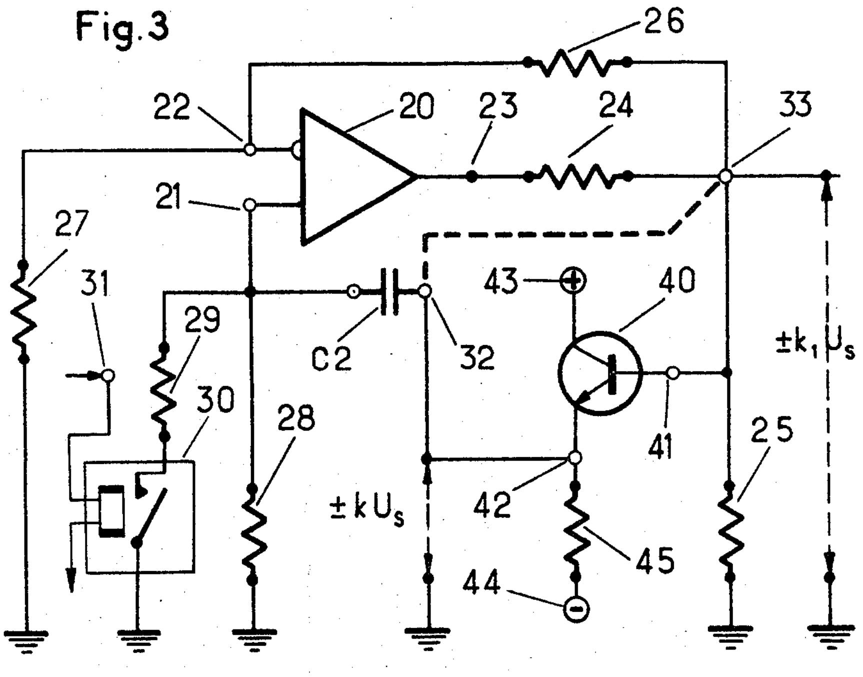
Figure 4:
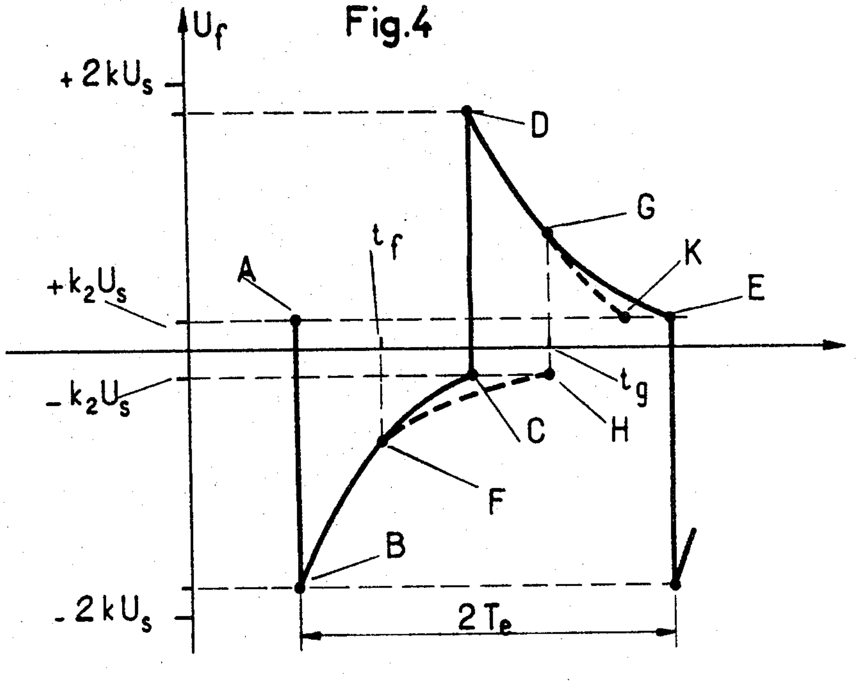

Other features and advantages of the invention will become apparent from the following description, reference being made to the accompanying drawings, the description and drawings being given by way of non-limitative example. In the drawings:

FIG. 1 is a circuit diagram of a conventional circuit arrangement of a multivibrator capable of being frequency-shift modulated and comprising an operational amplifier;

FIG. 2 comprises two graphs 2a, 2b to explain the operation of a device of the kind shown in FIG. 1;

FIG. 3 shows the circuit diagram of a frequency-shift modulatable oscillator according to the invention, and FIG. 4 is a graph which helps to explain the operation of the device shown in FIG. 3.

Referring first to FIG. 1, an operational amplifier 10 has an inverting input 11, a non-inverting input 12 and an output 13; a feedback circuit connects output 13 to each of the inputs via a resistor R1 (to input 11) of value $r_1$ and via a resistor R2 (to input 12) of value $r_2$; input 11 is grounded via a capacitor C1 of capacity $c_1$ and input 12 is grounded via a resistance R3 of value $r_3$. Another resistor R4 can be selectively shunted across resistor R3 by a switch 14 (shown open in FIG. 1) and the reference $r_{34}$ will be used hereinafter to denote the combined resistance of the resistors R3 and R4 when they are in parallel with one another. The switch 14 can be controlled from a data signal source and can be of any conventional kind, more particularly, e.g., electronic, to provide automatic changeover between the two switch positions.

According to what has now become conventional operational amplifier theory, the potential U at the output 13 takes up a saturation value $U^s$ relatively to the reference (ground) potential of the circuit arrangement, the saturation voltage polarity depending upon the difference between the respective potentials at the inputs 12 and 11 — i.e., the saturation potential is $+U_s$ if the difference is positive and $-U_s$ if the difference is negative. At an initial instant of time corresponding to energization of the circuit, the potential at the output 13 immediately takes up one of the two saturation potentials, for instance, $+U_s$.

The description of multivibrator operation shown in FIG. 1 is based on the graphs 2a and 2b which are shown in FIG. 2 and which respectively represent the variations of the output potential U and the variations of the potential $U_a$ at the input 11 with effect from the initial instant of time $t_o$; the scale of the potentials in graph 2b is larger than the scale of the potentials in graph 2a.

The capacitor C1, on the assumption that it is fully discharged, is charged up by the voltage $+U_s$, whereas the potential at the input 12 immediately rises to the value $U_b$ given (on the assumption that the switch 14 is in the closed state) by:

$$U_b = r_{34}\, U_s/(r_2 + r_{34})$$

The voltage $U_a$ reaches the value $U_b$ at a time $t_b$ and with a tendency to overshoot; the difference between the potentials at the inputs 12 and 11 changes direction, the potential at the output 13 changes from $+U_s$ to $-U_s$, and the capacitor C1, which experiences a new voltage greater than $U_b$ and in the opposite direction, charges up with opposite polarity until the voltage across this capacitor C1 becomes $-U_b$, whereupon the potential U changes from $-U_s$ to $+U_s$ and the capacitor C1 charges up in the original sense until the voltage across it is again $+U_b$, whereafter the phenomenon is repeated automatically in just the same way as in the first cycle.

The periodicity of multivibrator oscillations is equal to the duration of such cycle, and such duration is $2\,T_b$ (graph 2a), $T_b$ being defined from the curve of graph 2b, which gives the value:

$$2T_b = 2r_1c_1 \,\mathrm{Log}\left(1 + \frac{2r_{34}}{r_2}\right)$$

The description just given is for the case in which the switch 14 is in the closed state. When the switch 14 is opened, for instance, at the point 15, corresponding to the instant of time $t_c$ in graph 2*b*, the potential at the input 12 changes immediately to a new absolute value $U_c$ (with the same polarity — i.e., $-U_o$ — in the drawing) given by:

$$U_o = r_3 U_s/(r_2 + r_3)$$

and greater than $U_b$. The charging of the capacitor C1 does not cease at the point 16 but continues until the point 17 corresponding to the instant of time $t_d$, whereafter the capacitor C1 charges up with opposite sign until an instant of time ($t_d + \gamma T_d$) at which the voltage across it becomes $+U_c$, and so on first in one sense and then the other. The result is a new cycle of duration 2 $T_d$.

The phase of the signal from the multivibrator (graph 2*b*) experiences a considerable break after the point 15. Of course, if a signal of this kind is not to experience a phase break, the modification of the circuit to modify the oscillation frequency must correspond to a simple alteration of the time scale. In other words, the representation of the phenomenon must remain unchanged provided that the unit of time taken at any instant of time is proportional to the charging time constant of the capacitor C1.

This is not the case with the circuit in FIG. 1, where the oscillation frequency is modified without any corresponding alteration of the charging time constant of the capacitor C1. As FIG. 2 shows, the point 15 in graph 2*b*, which point was almost at the end of a cycle, is shifted by approximately 90°, the new end-of-cycle point being 17 instead of 16. The cycle corresponding to the interval D (graph 2*a*) is disturbed, and the shift which should have occurred at 18 is postponed until the point 19, yet the next cycle has the normal duration 2 $T_d$.

FIG. 3 shows an multivibrator arrangement according to the invention which prevents possible phase breaks at frequency shifting. The multivibrator circuit comprises an operational amplifier 20 having a non-inverting input 21, an inverting input 22 and an output 23 which is connected to output 33 of the multivibrator by a resistor 24, the same cooperating with a resistor 25 to form a voltage divider. A resistor 26 connects inputs 22 to output 33, and a resistor 27 connects input 22 to ground. A variable resistor consisting of a resistive circuit connecting the non-inverting terminal 21 to ground can take up either of two different values and is represented in FIG. 3 by two resistors 28, 29 and a selector switch 30 which can either disconnect resistor 29 or shunt the same across resistor 28. The selector 30 has a control input 31 receiving switching control signals from a data source. A transistor 40 has a base electrode 41 and an emitter electrode 42, and there can be seen d.c. supply terminals 43, 44 for supplying and biasing the transistor 40. The amplifier also comprises a resistor 45 and a capacitor C2, one side 32 of which is connected to the emitter 42 of transistor 40.

The transistor 40 is connected as an emitter follower and has a fairly high input impedance and a fairly high low output impedance; as regards the connection between the amplifier output 33 and the capacitor terminal 32, the transistor 40 can be replaced by any circuit having the same input and output impedance characteristics, the use of an emitter follower transistor being a preferred feature of a circuit according to the invention.

A description will now be given of how the system shown in FIG. 3 operates, reference being made to the graph shown in FIG. 4.

The potential at the amplifier output 33 is proportional to the potential at the point 23 — i.e., to $U_s$ — the relationship being determined by the resistance values of resistors 24, 25 — i.e., $r_4$ and $r_5$. The voltage applied to the RC circuit (28, 29, 30 and C2) from the terminal 42 follows the potential of the amplifier output 33 and is therefore proportional to $U_s$, with one or the other polarity — i.e., $\pm kU_s$ where $k$ depends upon characteristics of the circuit of transistor 40. Because of the high input impedance and low output impedance of transistor 40, the voltage-dividing relationships along the path extending from point 23 via resistor 24, amplifier output 33, point 41, transistor 40, point 42, point 32 and the input 21 to ground (the value of $k$ in particular) do not depend upon the relationship between the resistance values of the resistor 24 and the equivalent resistance to (28, 29), which latter varies with the position of the selector switch 30. If, however, the terminal 32 was directly connected to the amplifier output 33 as indicated by a broken line in FIG. 3, the voltage-dividing relationships along the path extending from the place 23 via resistor 24, amplifier output 33, point 32, capacitor C2, input 21 and the combined (parallel) value of resistors 28, 29 to would change with the position of the selector switch 30.

A condition will be considered in which the potentials of points 21, 22, 23 are positive, the potential $U_f$ of the input 21 being greater than the potential $U_e$ of the input 22. The potential of the amplifier output 33 is therefore:

$$U_d = k_1 U_s$$

and the potential at the input 22 is:

$$U_e = k_2 U_s,$$

$k_1$ and $k_2$ depending only upon the values of resistors 24 to 27. As capacitor C2 charges up, the potential $U_f$ of 21 decreases; when the latter potential becomes $U_e$, the multivibrator changes over and the potential $U_f$ alters from $U_e$ to:

$$U_e - (+2\,kU_s) = (k_2 - 2\,k)\,U_s.$$

The segment AB represents this changeover of the multivibrator in FIG. 4.

The capacitor C2 charges up in the sense of the new polarity, whereas the negative potential of terminal 21 increases from $(k_2 - 2\,k)\,U_s$, although decreasing in absolute value (arc BC), to become $-U_e$; the multivibrator flip-flops in the opposite direction to its previous flip-flopping (segment CD), the potential at D being $(2\,k - k_2)\,U_s$; the capacitor C2 charges up in the opposite direction (arc DE) to terminate the cycle which started at A; oscillation continues with a period 2 $T_e$ equal to:

$$2 r_8 c_2 \operatorname{Log}\left(\frac{2k}{k_2} - 1\right)$$

$r_8$ and $c_2$ denoting the values of resistance 28 and capacitance C2, respectively.

When resistors (28, 29) are switched at an instant of time $t_f$ (point F on arc BC), the cycle continues along the broken-line arc FH, flip-flopping occurring at the point H if such switching increases the time constant of the circuit formed by the elements C2, 28 and 29; as the arc GK indicates, however, if such time constant decreases flip-flopping can start at an instant of time $t_g$. The duration of the oscillation period is increased in the first case and decreased in the second case.

A frequency variation of the signal plotted in the graph in FIG. 4 starts at point F or at point G, since the rate of charging of the capacitor alters; this is equivalent to a simple change of time scale and therefore maintains phase continuity of the signal at the switching times of resistors 28 and 29.

In a device according to the invention, of which FIG. 3 shows a preferred form, there may be technological objections to using an operational amplifier. The potential $U_s$ at the place 23 is some 12 to 15 volts, which is as high as a "high-voltage" supply, and the extreme potentials at input 21 are $(2\,k - k_2)\,U_s$ and $[-(2\,k - k_2)\,U_s]$, which are near $2\,k\,U_s$ and $-2\,k\,U_s$. The number $k$ must be such that voltages of this nature can be applied without damage to the input of the operational amplifier 20; in practice the applied voltages do not exceed the magnitude order of 5 volts.

Appropriate values for the factors $k_1$, $k_2$ and $k$ can be obtained if resistors 24–27 are suitably dimensioned and if the characteristics of the circuit of transistor 40 are suitably chosen.

What I claim is:

1. An oscillating multivibrator capable of being phase-coherent frequency-shift modulated by modulation signals, comprising, in combination, an operational amplifier having a non-phase inverting first input, a phase-inverting second input and an output, a first voltage divider consisting of two series-connected resistors connected between said amplifier output and a reference potential point, the common point to said two resistors forming the output point of said multivibrator, a second voltage divider consisting of two further series-connected resistors and connected between said output point and said reference potential point, with the common point to said two further resistors connected to said second amplifier input, said oscillating multivibrator also comprising a coupling circuit connecting said output point to said first amplifier input, and a variable resistor having its resistance value controlled by modulating signals and connected by one of its terminals to said reference potential point and by the other of its terminals to said first amplifier input, said coupling circuit comprising a capacitor having one of its terminals connected to said first amplifier input and its other terminal connected to a coupling point in said coupling circuit, said coupling circuit presenting a high impedance path between said coupling point and said reference potential point and a low impedance path between said reference potential point and said output point.

2. An oscillating multivibrator as claimed in claim 1, in which said coupling circuit comprises an emitter-follower connected transistor having its base electrode connected to said output point and its emitter connected to said coupling point itself connected to said second terminal of said capacitor.

3. An oscillating multivibrator as claimed in claim 1, in which the variations of said variable resistor are controlled by a selector switch itself controlled by data transmission signals.

* * * * *